United States Patent [19]
Minnick et al.

[11] Patent Number: 5,261,984
[45] Date of Patent: Nov. 16, 1993

[54] STAMP PRESS PROCESS FOR IMPRINTING DECORATIVE TEXTURES IN THERMOPLASTIC COMPOSITES

[75] Inventors: Michael G. Minnick, Fort Wayne, Ind.; Carl E. Trewiler, Coshocton, Ohio

[73] Assignee: General Electric Company, Coshocton, Ohio

[21] Appl. No.: 823,504

[22] Filed: Jan. 21, 1992

[51] Int. Cl.$^5$ .............................................. B29C 59/02
[52] U.S. Cl. .................................... 156/209; 156/219; 156/228; 156/242; 156/245; 156/288; 264/219; 264/220
[58] Field of Search ............... 156/209, 219, 228, 288, 156/245, 242; 264/219, 220

[56] References Cited

U.S. PATENT DOCUMENTS

| | | | |
|---|---|---|---|
| 3,303,081 | 2/1967 | Michaelson et al. | 156/219 |
| 3,454,457 | 7/1969 | Hale et al. | 156/228 |
| 3,616,011 | 10/1971 | Endrizzi | 264/220 |
| 3,896,326 | 3/1975 | Matzke | 156/219 |
| 3,997,696 | 12/1976 | Jaisle et al. | 156/219 |
| 4,557,779 | 12/1985 | Bower et al. | 156/219 |
| 4,839,229 | 6/1989 | Jellinek et al. | 156/288 |

*Primary Examiner*—Caleb Weston

[57] ABSTRACT

Broadly, the present invention is directed to a method for making a mold capable of transferring three-dimensional relief from a textured substrate to thermoplastic composite material. This method comprises the steps of preparing a molding core by loading a press with outer layers of textured substrate and an inner layer comprising a combination of an epoxy non-woven glass mat and a woven glass cloth prepreg. The press is actuated at low pressure while applying heat to pregel said epoxy and then the pressure is increased to form the molding core. Molds are prepared by loading a press with outer layers of said molding core and an inner layer comprising a combination of an epoxy non-woven glass mat and a woven glass cloth prepreg. Finally, the press is actuated at low pressure while applying heat to pregel said epoxy and the increasing the pressure to form said molds. As another aspect of the present invention, a three-dimensional relief is imprinted from a textured substrate to a thermoplastic composite. This aspect of the present invention comprises preparing the molds as described above, which molds then are loaded into a press as outer layers with an inner layer comprising a reinforced thermoplastic composite which desirably is a polypropylene/random glass composite. The press then is actuated at low pressure and elevated temperature and then the pressure is stepped up to elevated pressure. When elevated molding pressure is achieved, the composite is immediately cooled under pressure. Finally, the press pressure is removed and the reinforced thermoplastic composite imprinted with the relief of the molds is recovered.

14 Claims, No Drawings

STAMP PRESS PROCESS FOR IMPRINTING DECORATIVE TEXTURES IN THERMOPLASTIC COMPOSITES

BACKGROUND OF THE INVENTION

The present invention relates to thermoplastic composits in general and more particularly to a stamp press process for imprinting decorative texture in thermoplastic composites, such as polypropylene/random glass composites.

The building and construction industry utilizes textured concrete forms (e.g. up to 4'×12' in dimension) when pouring concrete in highly visible structural components such as walls, floors, and the like. While it has been discovered that polypropylene/glass composites provide many advantages as a concrete form compared to alternative materials (e.g. polyester, fiberglass, plywood, etc.) including better release from cured concrete, less cleaning requirements between pours, and hence better longevity in repeated applications, there presently is no process available to imprint decorative textures in the polypropylene/glass composite material to provide a decorative finish.

Alternative approaches such as gravure rolls and stainless steel molds, for example, require a substantial volume of a singular pattern to justify costs of preparing such molds. Hence, a cost effective method of preparing molds meeting the processing requirements for low-to-intermediate volumes of concrete forms is desirable.

BROAD STATEMENT OF THE INVENTION

Broadly, the present invention is directed to a method for making a mold capable of transferring three-dimensional relief from a textured substrate to thermoplastic composite material. This method comprises the steps of preparing a molding core by loading a press with outer layers of textured substrate and an inner layer comprising a combination of an epoxy non-woven glass mat and a woven glass cloth prepeg. The press is actuated at low pressure while applying heat to pregel said epoxy and then the pressure is increased to form the molding core. Molds are prepared by loading a press with outer layers of said molding core and an inner layer comprising a combination of an epoxy non-woven glass mat and a woven glass cloth prepeg. Finally, the press is actuated at low pressure while applying heat to pregel said epoxy and then increasing the pressure to form said molds.

As another aspect of the present invention, a three-dimensional relief is imprinted from a textured substrate to a thermoplastic composite. This aspect of the present invention comprises preparing the molds as described above, which molds then are loaded into a press as outer layers with an inner layer comprising a reinforced thermoplastic composite which desirably is a polypropylene/random glass composite. The press then is actuated at low pressure and elevated temperature and then the pressure is stepped up to elevated pressure. When elevated molding pressure is achieved, the composite is immediately cooled under pressure. Finally, the press pressure is removed and the reinforced thermoplastic composite imprinted with the relief of the molds is recovered.

Advantages of the present invention include the ability to generate wood-grain texture (simulating a "barn door" wood grain effect) in concrete by use of the relief composite molds of the present invention. Another advantage is the ability to prepare such relief molds cost effectively for low-to-medium volume usage. A further advantage is the ability to prepare such molds from polypropylene/random glass composites. Yet another advantage is the ability to prepare molds from other patterns (mosaic, brick, stucco, etc.) utilizing the stamp press process of the present invention. These and other advantages will be readily apparent to those skilled in the art based upon the disclosure contained herein.

DETAILED DESCRIPTION OF THE INVENTION

The present invention functions efficaciously with a daylight steam press for preparation of the molds, as well as using such molds to imprint three-dimensional relief into thermoplastic composites. Broadly, such operation is known as stamp pressing utilizing a stamp press, for present purposes. Using multi-opening daylight steam presses means that the temperature necessarily must be maintained at a temperature adequate for the thermoplastic materials to flow, yet the temperature must be insufficient for causing the thermoplastic material to liquefy and run out the openings of the press. As such, temperature control necessarily is important, though such temperature control is well within the operating knowledge of press operators utilizing such presses in present commercial operations. The same knowledge applies for the epoxy component of the prepregs utilized in mold preparation.

In order to illustrate the present invention, an illustrative example will be described. It will be appreciated that such example is for illustrative purposes and is not to be construed as a limitation of the present invention. In order to generate a wood grain texture (simulating a barn door wood grain effect), white pine boards (optionally 1"×4") were pressed in a steam-heated daylight press at 500 psi and 180° C. for 45 minutes to pre-compress the wood so that it was in a condition to withstand subsequent high pressure (>100 psi) lamination operations. The compression resulted in almost a two-fold increase in density (the thickness of the boards was reduced from ¾" to ⅜"). The boards then were brushed with a wire brush (optionally, sandblasting of the boards is a viable procedure) to erode the soft wood from between the hardened grain, thus exaggerating the grain effect.

"One-sided" or "two-sided" cores (i.e. mold patterns) then are capable of being prepared by laying up with a balanced construction of epoxy impregnated glass mat and glass cloth prepregs. Glass cloth composites conventionally have been prepared by dipping woven or non-woven glass cloth in solutions containing a thermoset (or stabilized thermoplastic) resin and "B staging" by over drying the impregnated fabric in a high temperature oven. This operation also can be conducted continuously. Laminates subsequently are formed by "laying up" or collating one or more plies of the so-called "prepregs" and consolidating the plies with high temperature and pressure being applied.

Since the present invention relies on a balanced construction or combination of epoxy impregnated glass mat and glass cloth prepregs, it will be appreciated that many styles of woven fabrics lend themselves to this type of process. Such non-woven glass mat and woven glass cloth prepregs are well known in the art and little more description of them need be detailed here. It will be appreciated that such prepregs comprise a fibrous substrate (woven and non-woven) such as glass, quartz, polyester, polyamide, polypropylene, cellulose, nylon, or acrylic fibers, though preferably glass, impregnated with epoxy is used. Thus, for present purposes, the present invention will be illustrated with respect to glass as the reinforcing fiber, although such other fibers can be used as is necessary, desirable, or convenient.

The lay-up for preparation of the "negative" of the consolidated boards is illustrated in Table 1 below which also can be used in preparing the "negatives" or mold itself. This build-up then was loaded into the multi-opening daylight press, using press pins, pad stock, and cover pans, known to the art of high pressure lamination, and pressed at very low pressures (<50 psi) and heated to 160° C. After a heat soak of 160° for 15-20 minutes (to allow the epoxy to pregel), the pressure was stepped up to 200 psi in discrete steps and the temperature increased to 180° C. for one hour to fully cure the epoxy resin. Increasing the pressure in discrete steps lessens the tendency of the wood grain structure to be flattened out and lost. Following this lamination cycle, the cores were separated from the wood and found to have a detail reverse imprint (negative) of the wood grain.

"positive" imprint of the wood grain was observed on the finished molds.

The molds then can be used for preparing textured thermoplastic composites, preferably made from polypropylene though polycarbonate composites for flame retardancy, bis-maleimides, and other thermoplastic materials, suitably reinforced, could be used as necessary, desirable, or convenient. Fiber-reinforced polypropylene sheets are preferred and preferably such sheets utilize continuous strand glass fiber in a proportion of between about 30% and 40% by weight, though chopped, i.e., non-continuous, fiber can be used. A preferred reinforced polypropylene is AZDEL brand glass fiber-reinforced polypropylene (Azdel, Inc). The polypropylene sheets typically range in thickness from between about 3.4 mm and 4 mm.

To prepare a wood imprint polypropylene concrete form with a reverse wood imprint pattern, the AZDEL polypropylene sheets were stacked with the molds in a configuration described in Table 2. This lay-up was heated in the stamp press with a minimum pressure (<50 psi) and heated to 155°-160° C. The pressure then was stepped up to 200 psi and immediately cooled under

TABLE 1

PREPARATION OF WOOD IMPRINT CORES/MOLDS

| | |
|---|---|
| ═══════════════════════════════ | → PRESS PAN |
| L L L L L L L L L L L L L L L L L L L L L L L L L | → COMPRESSED WOOD OR PATTERN CORE |
| ─────────────────────────────── | → RELEASE FILM* (OPTIONAL) |
| ============================== | → EPOXY GLASS MAT PREPREG** |
| ++++++++++++++++++++++++++++++ | → EPOXY GLASS CLOTH PREPREG*** |
| ==============================<br>============================== | |
| ==============================<br>==============================<br>++++++++++++++++++++++++++++++<br>============================== | → EPOXY GLASS MAT PREPREG (5-10 PLIES) |
| ─────────────────────────────── | → RELEASE FILM* (OPTIONAL) |
| L L L L L L L L L L L L L L L L L L L L L L L L L | → COMPRESSED WOOD OR PATTERN CORE |
| ─────────────────────────────── | → RELEASE FILM* (OPTIONAL) |
| ============================== | → EPOXY GLASS MAT PREPREG** |
| ++++++++++++++++++++++++++++++ | → EPOXY GLASS CLOTH PREPREG*** |
| ==============================<br>============================== | |
| ==============================<br>==============================<br>++++++++++++++++++++++++++++++<br>============================== | → EPOXY GLASS MAT PREPREG (3-7 PLIES) |
| ─────────────────────────────── | → RELEASE FILM* (OPTIONAL) |
| ═══════════════════════════════ | → PRESS PAN |

*DUPONT TEDLAR (1 ML GUAGE). NOTE: USE OF RELEASE ON WOOD OR CORES MAY ELIMINATE NEED FOR RELEASE SHEET, E.I. DUPONT DE NEMOURS & CO., WILMINGTON, DE.
**GE 11162 EPOXY PREPREG: 83% RESIN CONTENT, 35% SQUEEZE OUT VALUE (IPC TM 2.3.17B), GENERAL ELECTRIC COMPANY, PITTSFIELD, MA.
***GE 16012 PREPREG: 45% RESIN CONTENT, 28% SQUEEZE OUT VALUE, 110 SECONDS TACK TIME (SEE IPC TM 2.3.18), GENERAL ELECTRIC COMPANY, PITTSFIELD, MA.

The wood grain molds then were prepared using the same stack of prepregs and build-up as described in Table 1, with the cores replacing the wood. Using the same lamination of the cycle described above, a detailed pressure. The AZDEL polypropylene boards then were separated from the molds imprinted with highly detailed wood grain pattern. Again, the gradual step-up in pressure suppresses the tendency of the wood grain detail in the molds to be crushed during the high pressure operation.

TABLE 2
PREPARATION OF AZDEL FORMS

| | |
|---|---|
| ═══════════════════════════ | → PRESS PAN |
| M M M M M M M M M M M M M M M M | → WOOD GRAIN MOLD |
| ─────────────────────── | → RELEASE FILM* (OPTIONAL) |
| <<<<<<<<<<<<>>>>>>>>>>>> | → AZDEL SM10400 |
| ─────────────────────── | → RELEASE FILM* (OPTIONAL) |
| ═══════════════════════════ | → PRESS PAN (OPTIONAL) |
| ─────────────────────── | → RELEASE FILM* (OPTIONAL) |
| <<<<<<<<<<<<>>>>>>>>>>>> | → AZDEL SM10400 |
| ─────────────────────── | → RELEASE FILM* (OPTIONAL) |
| M M M M M M M M M M M M M M M M | → WOOD GRAIN MOLD |
| ─────────────────────── | → RELEASE FILM* (OPTIONAL) |
| <<<<<<<<<<<<>>>>>>>>>>>> | → AZDEL SM10400 |
| ─────────────────────── | → RELEASE FILM* (OPTIONAL) |
| ═══════════════════════════ | → PRESS PAN |

It will be appreciated that other patterns such as mosaic, brick, stucco, or the like could be prepared using the same methodology. It further will be appreciated that room temperature curable epoxy prepregs also could be used.

Also, it will be appreciated that the foregoing description is illustrative of the invention and should not be construed as limiting. Obvious changes, variations, and modifications can be made providing that the spirit and precepts of the present invention are maintained.

We claim:

1. A method for making a mold capable of transferring three-dimensional relief from a textured substrate to thermoplastic composites, which comprises the steps of:
   (a) preparing a molding core by loading a press with outer layers of the textured substrate and an inner layer, said inner layer being comprised of at least one epoxy nonwoven fiber mat and at least one woven fiber cloth prepreg;
   (b) actuating said press in step (a) at low pressure while applying heat to pregel said epoxy, and then increasing said pressure to form said molding core;
   (c) preparing molds by loading a press with outer layers of said molding core of step (b) and an inner layer, said inner layer being comprised of at least one epoxy nonwoven glass mat and at least one woven glass cloth prepreg, and
   (d) actuating said press in step (c) at low pressure while applying heat to pregel said epoxy, and then increasing said pressure to form said molds.

2. The method of claim 1 wherein press in steps (b) and (d) is actuated at a pressure of not above about 50 psi and a temperature of about 160° C. to pregel said epoxy and then the pressure and temperature are increased to fully cure said epoxy.

3. The method of claim 2 wherein said temperature is increased to about 180° C. and said pressure to about 200 psi in discrete steps to fully cure said epoxy.

4. The method of claim 1 wherein said textured substrate is one or more of wood, mosaic, brick, or stucco.

5. The method of claim 1 wherein said textured substrate comprises wood which has been pressed at elevated temperature and pressure prior to step (a).

6. The method of claim 5 wherein said wood has been pressed at 500 psi and 180° C.

7. The method of claim 1 wherein said mat comprises an epoxy nonwoven glass mat and said prepreg comprises a woven glass cloth prepreg.

8. A method for imprinting three-dimensional relief into a thermoplastic composite from a textured substrate, which comprises the steps of:
   (a) preparing a molding core by loading a press with outer layers of the textured substrate and an inner layer, said inner layer being comprised of at least one epoxy nonwoven glass mat and at least one woven glass cloth prepreg;
   (b) actuating said press in step (a) at low pressure while applying heat to pregel said epoxy, and then increasing said pressure to form said molding core;
   (c) preparing molds by loading a press with outer layers of said molding core of step (b) and an inner layer, said inner layer being comprised of at least one epoxy nonwoven glass mat and at least one woven glass cloth prepreg;
   (d) actuating said press in step (c) at low pressure while applying heat to pregel said epoxy, and then increasing said pressure to form said molds;
   (e) loading a press with outer layers of said molds of step (d) and an inner layer comprising a reinforced thermoplastic composite;
   (f) actuating said press in step (d) at low pressure and elevated temperature, stepping up the pressure to elevated pressure, and then immediately cooling said composite under said elevated pressure; and
   (g) removing said press pressure and recovering said reinforced thermoplastic composite imprinted with the relief of said molds of step (d).

9. The method of claim 8 wherein press in steps (b) and (d) is actuated at a pressure of not above about 50 psi and a temperature of about 160° C. to pregel said epoxy and then the pressure and temperature are increased to fully cure said epoxy.

10. The method of claim 9 wherein said temperature is increased to about 180° C. and said pressure to about 200 psi in discrete steps to fully cure said epoxy.

11. The method of claim 8 wherein said textured substrate is one or more of wood, mosaic, brick, or stucco.

12. The method of claim 8 wherein said textured substrate comprises wood which has been pressed at elevated temperature and pressure prior to step (a).

13. The method of claim 12 wherein said wood has been pressed at 500 psi and 180° C.

14. The method of claim 8 wherein said press in step (f) is actuated at a pressure of not above about 50 psi and a temperature of about 150°–160° C. and then the pressure is stepped up to about 200 psi at which time the mold contents are cooled under pressure.

* * * * *